May 25, 1937. E. G. MYERS 2,081,552
MIXING APPARATUS
Filed Oct. 14, 1935
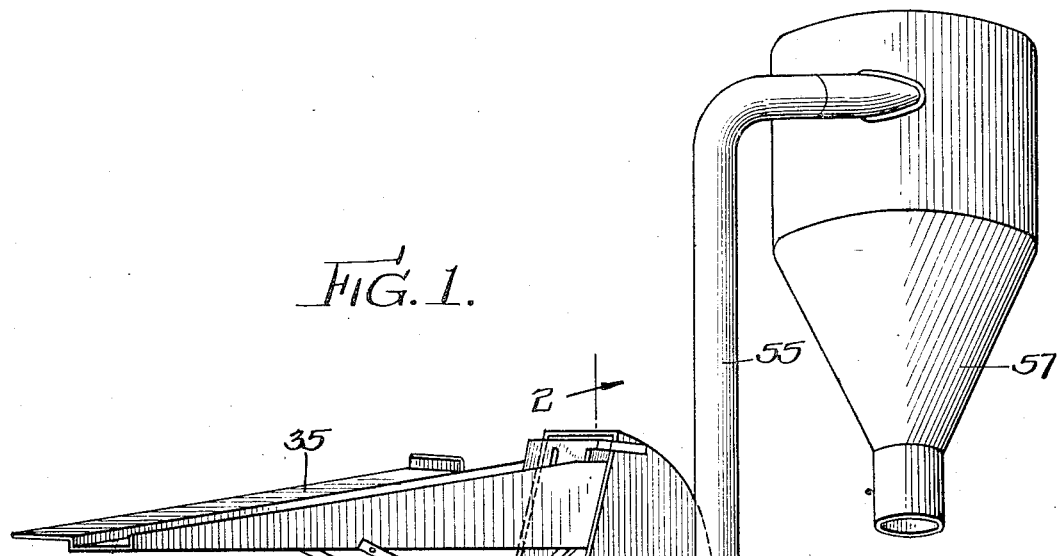
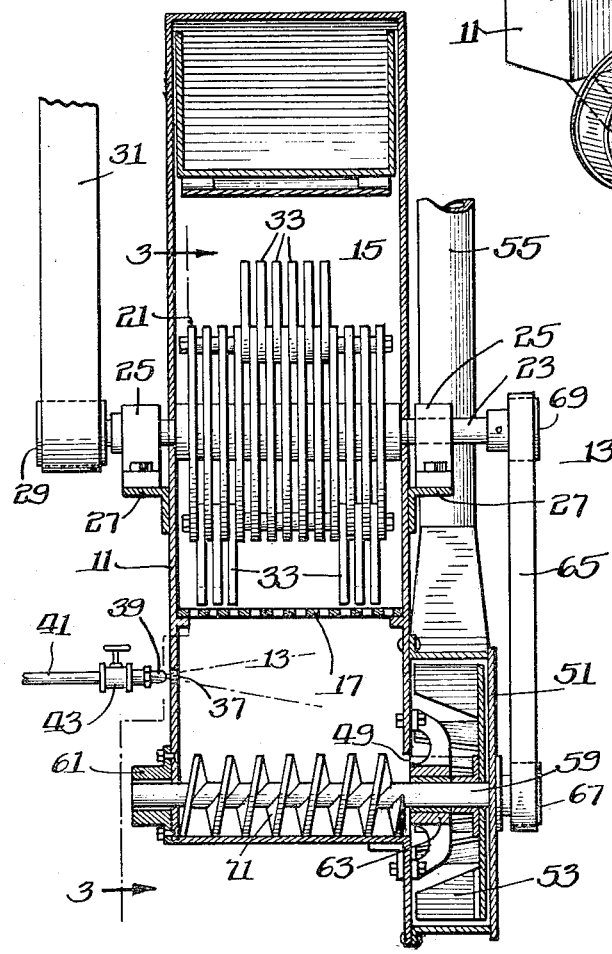
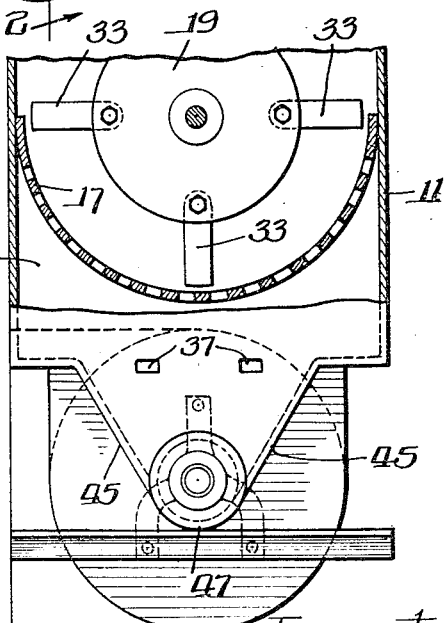
Inventor
Elias G. Myers
By: Cox & Moore attys.

Patented May 25, 1937

2,081,552

UNITED STATES PATENT OFFICE 2,081,552

MIXING APPARATUS

Elias G. Myers, Toledo, Ohio, assignor to The Myers-Sherman Company, Chicago, Ill., a corporation of Ohio Application October 14, 1935, Serial No. 44,910

4 Claims. (Cl. 259—9)

My invention relates in general to mixing and has more particular reference to means for and method of mixing feeds, more particularly the mixing of liquid food ingredients with subdivided solid foodstuffs.

An important object of the invention resides in the provision of a new mode of introducing a liquid, such as molasses, with subdivided edible material, such as ground grain, hay, alfalfa and other vegetable matter such as may be used in mixtures more especially for animal feed.

Another important object is to provide for mixing the liquid ingredient with the ground material by injecting the same under pressure into a subdivided stream of the ground material, preferably as delivered from a grinding device.

Another important object is to provide for mixing the liquid ingredient uniformly and evenly with the ground material and to carry out the mixing as a continuous process.

Among the other objects and advantages of the invention is to inject the liquid ingredient under pressure into the subdivided solid material; to introduce the liquid ingredient into a descending stream of ground material falling beneath a grinder; to provide a conveyor, preferably in the form of a screw, for the mixture whereby the same is further agitated and delivered axially to a blower for removal to a remote storage compartment; to drive the blower and conveyor from a common power source; to drive the grinder, conveyor and blower from a common prime mover; and, in general, to provide a compact mixing apparatus having the many advantages hereinafter set forth.

Numerous other objects, advantages and inherent functions of the apparatus embodying my invention will be more fully understood from the following description which, taken in connection with the accompanying drawing, discloses a preferred embodiment of the invention.

Referring to the drawing:

Fig. 1 is a perspective view of mixing apparatus embodying my present invention;

Fig. 2 is a sectional view taken substantially along the line 2—2 of Fig. 1; and Fig. 3 is a sectional view taken substantially along the line 3—3 in Fig. 2.

To illustrate my invention I have shown on the drawing a mixing device comprising a casing 11 forming a mixing chamber 13 in its lower portions and a grinding chamber 15 upwardly of the mixing chamber, the mixing and grinding chambers being separated by a screen 17 comprising, in the illustrated embodiment, a perforated sheet mounted within the casing and curved circularly, as shown, to accommodate rotatable grinding means 19 disposed in the chamber 15 above the screen 17. The grinding means preferably comprises a framework 21 mounted for rotation on a shaft 23 which extends at its opposite ends through the walls of the casing 11 and is journalled in bearings 25 which are carried in brackets 27 on the casing 11. One end of the shaft 23 may be provided with a pulley 29 adapted to receive a driving belt 31, or other suitable means may be used for rotating the shaft and the framework 21. At preferably circularly spaced intervals on the periphery of the frame 21 a plurality of tiltably mounted beating arms or hammers 33 are mounted, said hammers being of a length sufficient to sweep adjacent the curved screen 17 when the grinding device is rotated, so that grain, hay or other vegetable food material introduced into the grinding chamber 15, as by means of a suitable trough 35, may be subdivided by the hammers 33 in accordance with the well known principle of the hammer mill.

After thus being reduced to a desired size the subdivided particles may penetrate the perforations of the screen 17 and will fall by gravity through and to the bottom of the mixing chamber 13 in the form of a downwardly descending stream or cloud of subdivided material. The walls forming the sides of the mixing chamber 13 are or may be formed with one or more openings 37, and a suitable nozzle 39 connected with a supply pipe 41 is arranged opposite each of the openings 37 in position to direct a stream of liquid through the opening 37 and into the descending cloud of subdivided material descending in the chamber 13. The supply pipe 41 may be and preferably is provided with a control valve 43, and the pipe 41 may extend to any suitable liquid supply system, preferably including fluid forcing means for delivering the liquid to the nozzle under pressure. If desired, the supply system may include suitable means for heating the liquid, such provision being especially desirable where the liquid comprises molasses which tends to harden at low temperatures.

The walls of the chamber 13 preferably converge as at 45 to form a trough 47 at the lower end of the chamber 13, and an opening 49 is provided in the walls of the casing at one end of the trough. A blower comprising a housing 51 and a rotor or fan 53 is mounted on the casing 11 opposite the opening 49, said blower preferably comprising a centrifugal device adapted to draw the mixed material out of the chamber 13 through the opening 49 axially of the rotor 53, and to deliver the mixed material by centrifugal action through a conduit 55 leading to a remote storage compartment 57 for the mixed feed. To this end the fan or rotor 53 is carried on a shaft 59 which preferably extends through the opening 49 and through the trough 47, being journaled in bearings 61 and 63 carried by the walls of the casing 11. The bearing 63 is preferably enclosed by the blower casing and the shaft 59 extends outwardly of said casing. Driving means for the blower preferably comprising a belt 65, is carried by a pulley 67 on the shaft 59 and a pulley 69 on the shaft 23 so that the blower may be driven by the grinding means 19.

I also prefer to provide a conveyor in the trough 47 for positively delivering the mixed feed, reaching the bottom of the chamber 13, to the opening 49 and the blower. This conveyor may take the form of a screw device 71, which may conveniently be mounted on or formed integral with a portion of the shaft 59 extending in the chamber 13, so that the conveyor is actuated by the blower. If desired, the conveyor may be operated at reduced speed by separating the shaft 59 and providing suitable speed reducing means between the portion of the shaft carrying the fan 53 and the portion carrying the conveyor screw 71. In any event, the blower reduces pressure within the chamber 13 so that the liquid spray is applied to the subdivided material in the chamber 13 under reduced pressure conditions.

One of the important phases of the invention resides in applying the impregnating liquid to the ground feed while the same is in the hammer mill, more particularly immediately after the ground feed has passed through the screen 17 and as it is delivered to the blower 53. This results in improved penetration of the liquid into the subdivided particles whereby more uniform mixing is attained. The apparatus, moreover, is neat and compact, not overly expensive to build, and provides satisfactory operation with a minimum of attention. The mixture produced is of superior quality and of more uniform texture than that produced by methods heretofore employed.

It is thought that the invention and numerous of its attendant advantages will be clearly understood from the foregoing description, and it is obvious that numerous changes may be made in the form, construction and arrangement of the several parts without departing from the spirit or scope of the invention and without sacrificing its attendant advantages, the form herein described being a preferred embodiment for the purpose of illustrating the invention.

The invention is hereby claimed as follows:

1. Mixing apparatus comprising a casing, a partition within the casing and comprising a perforated element defining an upper grinding chamber and a lower mixing chamber within the casing, grinding means in the upper chamber for subdividing solid edible material to a size permitting the subdivided material to penetrate the screen and form a cloud of subdivided material in the mixing chamber, means for spraying a liquid into the said cloud of material within the mixing chamber while the same is settling whereby to impregnate the subdivided material within said mixing chamber, said mixing chamber having walls converging downwardly to form a receiving trough into which the impregnated particles may drop, means for removing the impregnated and settled feed mix from said trough, and means for reducing pressure in said mixing chamber to facilitate impregnation therein.

2. Mixing apparatus comprising a casing, a partition within the casing comprising a perforated element defining an upper grinding chamber and a lower mixing chamber within the casing, grinding means in the upper chamber for subdividing solid edible material to a size permitting it to penetrate the perforated element and form a cloud of subdivided material in the mixing chamber, means for spraying a liquid into the said cloud of subdivided material within the mixing chamber whereby to impregnate and roughly mix the subdivided material with said liquid, and a blower fan connected with said mixing chamber out of alignment with the spraying means for drawing the roughly mixed material from the mixing chamber and delivering it outwardly of said chamber in finely mixed condition.

3. Mixing apparatus comprising means forming a mixing chamber, means to deliver subdivided solid edible material in said mixing chamber, means for spraying a liquid into the said subdivided material in the mixing chamber whereby to impregnate and roughly mix the subdivided material with the liquid, and an exhaust fan located out of alignment with the spraying means and connected with said chamber for drawing the mixed material from the chamber while vigorously agitating the same in order to thoroughly and finely mix the liquid with said subdivided material and deliver the same outwardly of said chamber.

4. Mixing apparatus comprising means forming a mixing chamber, means to deliver subdivided solid edible material in said mixing chamber, means for spraying a liquid into the said subdivided material in the mixing chamber whereby to impregnate and roughly mix the subdivided material with the liquid, an exhaust fan connected with said chamber for drawing the mixed material from the chamber while vigorously agitating the same in order to thoroughly and finely mix the liquid with said subdivided material and deliver the same outwardly of said chamber, and a screw conveyor in said chamber for delivering the roughly mixed material to said blower fan.

ELIAS G. MYERS.